(12) United States Patent
Nishigaki

(10) Patent No.: US 8,351,653 B2
(45) Date of Patent: Jan. 8, 2013

(54) DISTANCE ESTIMATION FROM IMAGE MOTION FOR MOVING OBSTACLE DETECTION

(75) Inventor: Morimichi Nishigaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 12/869,629

(22) Filed: Aug. 26, 2010

(65) Prior Publication Data

US 2012/0051600 A1    Mar. 1, 2012

(51) Int. Cl.
*G06K 9/00* (2006.01)
(52) U.S. Cl. ........................................ 382/107
(58) Field of Classification Search ............. 382/103, 382/107; 375/240.01, 240.16
See application file for complete search history.

(56) References Cited

U.S. PATENT DOCUMENTS

| | | | |
|---|---|---|---|
| 5,195,144 A | 3/1993 | Le Parquier et al. | |
| 5,577,130 A | 11/1996 | Wu | |
| 5,867,256 A | 2/1999 | Van Rheeden | |
| 6,888,447 B2 | 5/2005 | Hori et al. | |
| 2008/0007627 A1 | 1/2008 | Huang | |
| 2008/0199050 A1* | 8/2008 | Koitabashi | 382/107 |

FOREIGN PATENT DOCUMENTS

WO    WO 2006/083639    8/2006

OTHER PUBLICATIONS

Rao, R. et al., "A Video Processing Approach for Distance Estimation," *IEEE International Conference on Acoustics, Speech and Signal Processing*, 2006, vol. 3, 4 pages.

Sjo, K. et al., "Object Search and Localization for an Indoor Mobile Robot," *Journal of Computing and Information Technology—CIT 17*, 2009, pp. 67-80, vol. 1.

Tjandranegara, E., "Distance Estimation Algorithm for Stereo Pair Images," *Electrical and Computer Engineering ECE Technical Reports*, 2005, Purdue Libraries, Purdue University, Indiana, USA, eight pages.

\* cited by examiner

*Primary Examiner* — Brian Le

(74) *Attorney, Agent, or Firm* — Fenwick & West LLP; Mark E. Duell

(57) ABSTRACT

Distance from a moving image capture device to one or more points is determined. An optical flow is calculated from a first image and a second image captured by the moving image capture device. The horizontal component of the optical flow is used to generate a horizontal distance map including horizontal distances and the vertical component of the optical flow is used to generate a vertical distance map including vertical distances. Horizontal weights are applied to the horizontal distance map to generate a modified horizontal distance map where horizontal distances proximate to a vertical line intersecting a focus of expansion are attenuated. Vertical weights are applied to the vertical distance map to generate a modified vertical distance map where vertical distances proximate to a horizontal line intersecting the focus of expansion are attenuated. The modified vertical distance map and the modified horizontal distance map are then summed.

30 Claims, 8 Drawing Sheets

DISTANCE ESTIMATION FROM IMAGE MOTION FOR MOVING OBSTACLE DETECTION

FIELD OF THE INVENTION

This invention relates generally to object detection, and more particularly to identifying moving objects based on differences between images captured from a stereo image capture device and from a moving image capture device.

BACKGROUND OF THE INVENTION

Conventional techniques for determining distance between an image capture device and a stationary object do not account for certain types of errors which limit the accuracy of the determined distance. Conventional distance estimation techniques have significant errors when estimating distance to objects proximate to a horizontal or vertical line intersecting the focus of expansion of an image.

SUMMARY OF THE INVENTION

The present invention provides a system and method for determining a distance from a moving image capture device to one or more points. A first image and a second image are received from the moving image capture device and an optical flow is calculated using the first image and the second image. Using a horizontal component of the optical flow, a horizontal distance map including horizontal distances from the moving image capture device to a plurality of points is determined. Similarly, a vertical component of the optical flow is used to determine a vertical distance map including vertical distances from the moving image capture device to the plurality of points. A set of horizontal weights are applied to the horizontal distance map to generate a modified horizontal distance map by attenuating horizontal distances associated with pixels in the horizontal distance map proximate to a vertical line intersecting a focus of expansion of the horizontal distance map. Similarly, a set of vertical weights are applied to the vertical distance map to generate a modified vertical distance map by attenuating vertical distances associated with pixels in the vertical distance map proximate to a horizontal line intersecting the focus of expansion of the vertical distance map. A distance map is generated by combining the modified horizontal distance map and the modified vertical distance map. In one embodiment, the modified horizontal distance map and the modified vertical distance map are summed to generate the distance map. The distance map is then stored.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
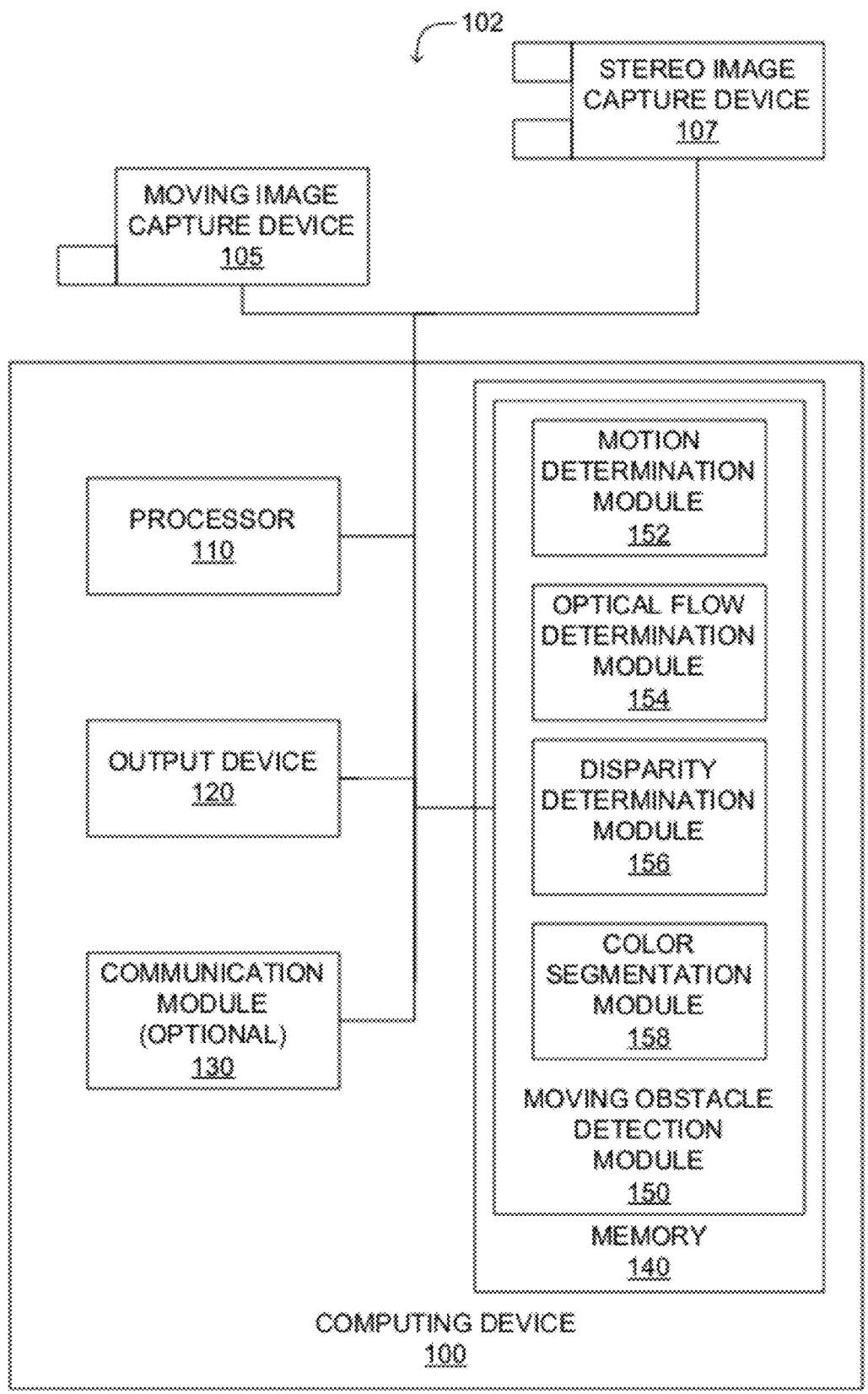
FIG. 1 is an illustration of a computing system in which one embodiment of the present invention operates.

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computing system 102 in which one embodiment of the present invention may operate. The computing system 102 includes a computing device 100, a moving image capture device 105 and a stereo image capture device 107. The computing device 100 comprises a processor 110, an output device 120 and a memory 140. In an embodiment, the computing device 100 further comprises a communication module 130 including transceivers or connectors. In other embodiments, the computing system 102 may include additional components, such as one or more input devices.

The moving image capture device 105, is a video camera, a video capture device or another device capable of electronically capturing data describing the movement of an entity, such as a person or other object. For example, the moving image capture device 105 captures image data or positional data. The moving image capture device 105 is coupled to the computing device 100 and transmits the captured data to the computing device 100.

The stereo image capture device 107 comprises an image capture device having two or more lenses each associated with a separate image sensor. The lenses included in the stereo image capture device 107 are separated by a predetermined spacing, or "baseline," allowing the computing device 100 to measure of distances, or disparities, from the stereo image capture device 107 to using images captured using different lenses. The length of the baseline, or separation between lenses in the stereo image capture device 107, affects the accuracy of distance measured using images captured by different lenses, with a larger baseline increasing the accuracy of the distance measurement. However, a large baseline may increase the complexity of disparity measurement. In one embodiment, lenses of stereo image capture device 107 have a baseline, or separation, of 24 centimeters. For accurate calculation of distance or disparity by the computing device 100, different lenses and their corresponding image sensors in the stereo image capture device 107 capture images at substantially the same time. Although shown in FIG. 1 as discrete devices, in one embodiment the moving image capture device 105 comprises a lens and its associated image sensor included in the stereo image capture device 107.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included in the computing device 100. The processor 110 comprises an arithmetic logic unit, a microprocessor or some other information appliance equipped to transmit, receive and process electronic data signals from the memory 140, the output device 120, the communication module 130 or other modules or devices.

The output device 120 represents any device equipped to display electronic images and data as described herein. Output device 120 may be, for example, an organic light emitting diode display (OLED), a liquid crystal display (LCD), a cathode ray tube (CRT) display or any other similarly equipped display device, screen or monitor. In one embodiment, output device 120 is equipped with a touch screen in which a touch-sensitive, transparent panel covers the screen of output device 120.

In one embodiment, the computing device 100 also includes a communication module 130 which links the computing device 100 to a network (not shown) or to other computing devices 100. The network may comprise a local area network (LAN), a wide area network (WAN) (e.g., the Internet), and/or any other interconnected data path across which multiple devices man communicate. In one embodiment, the communication module 130 is a conventional connection, such as USB, IEEE 1394 or Ethernet, to other computing devices 100 for distribution of files and information. In another embodiment, the communication module 130 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

The memory 140 stores instructions and/or data that may be executed by processor 110. The instructions and/or data may comprise code that performs any and/or all of the techniques described herein when executed by the processor 110. Memory 140 may be a dynamic random access memory (DRAM) device, a static random access memory (SRAM) device, a Flash RAM or another non-volatile storage device, combinations of the above, or some other memory device known in the art. The memory 140 is adapted to communicate with the processor 110, the output device 120 and/or the communication module 130.

In one embodiment, the memory 140 includes a moving obstacle detection module 150 having instructions for executing a method for detecting one or more moving objects by analyzing images received from the moving image capture device 105 and the stereo image capture device 107. For example, the processor 110 executes instructions, or other computer code, stored in the moving obstacle detection module 150 to identify moving objects within images captured by the moving image capture device 105 and by the stereo image capture device 107. In one embodiment, the moving obstacle detection module 150 includes a motion determination module 152, an optical flow determination module 154, a stereo disparity determination module 156 and a color segmentation module 158.

The motion determination module 152 includes computer executable code, such as data or instructions, that, when executed by the processor 110, remove rotational motion from the images captured by the moving image capture device 105. Rotational motion is caused by movement of the moving image capture device 105. While the motion determination module 152 removes rotational motion from captured images, translational motion in the captured images is preserved. Hence, a method described by instructions or code stored in the motion determination module 152 generates a modified sequence of images from images captured by the moving image capture device 105 where rotational motion is removed from the modified images while translational motion is retained. Preserving translational motion within the images allows detection or identification of moving objects within the field of view of the moving image capture device 105. Because rotational motion from movement of the moving image capture device 105 itself reduces the accuracy of moving object detection, removing rotational motion from images captured by the moving image capture device 105 allows more accurate detection of moving objects. One embodiment of a method for cancelling rotational motion stored in the motion determination module 152 is further described below in conjunction with FIG. 3.

The optical flow determination module 154 includes computer executable code, such as data or instructions, that, when executed by the processor 110, calculate an optical flow of images received from the moving image capture device 105. The calculated optical flow associates a two-dimensional vector with multiple pixels in an image captured by the moving image capture device 105. In one embodiment, the optical flow associates a two-dimensional vector with each pixel in an image captured by the moving image capture device 105. The two-dimensional vector associated with a pixel describes the relative motion of an object associated with the pixel between the moving image capture device 105 and one or more entities or objects included in the image captured by the moving image capture device 105. In one embodiment, the optical flow determination module 154 uses a "block matching" method for efficient computation of a dense and accurate optical flow. However, in other embodiments, the optical flow determination module 154 may use any of a variety of methods for optical flow calculation.

In one embodiment, the optical flow determination module 154 also modifies the calculated optical flow to increase the density or accuracy of the calculated optical flow. For example, the optical flow determination module 154 uses data from the color segmentation module 158, further described below, to reduce noise in the optical flow and determine additional optical flow data. For example, the color segmentation module 158 identifies various segments of an image from the moving image capture device 105 which are used by the optical flow determination module 154 to estimate motion model parameters. The optical flow determination module 154 then recomputes the optical flow using the motion model parameters.

The disparity determination module 156 includes computer executable code, such as data or instructions, that, when executed by the processor 110, calculate the stereo disparity of images from the stereo image capture device 107 and/or calculate motion disparity of images from the moving image capture device 105. Stereo disparity describes the difference between an object's position in images captured by different lenses in the stereo image capture device 107. In one embodiment, the disparity determination module 156 calculates motion disparity for different pixels within an image from the moving image capture device 105 by determining the difference between a coordinate associated with the pixel and the focus of expansion of the image. The difference is then divided by a component of the optical flow associated with the pixel. In one embodiment, a horizontal motion disparity and a vertical motion disparity are respectively computed from a horizontal distance from a pixel coordinate to the focus of expansion of an image and a horizontal component of the optical flow and from a vertical distance from a pixel coordinate to the focus of expansion of an image and a vertical component of the optical flow, respectively. The focus of expansion of an image is a point in the image from which a majority of image motion trajectories originate or a point in the image where a majority of image motion trajectories end.

The disparity determination module 156 also calculates a scale associated with an image from the moving image capture device 105. In one embodiment, the scale is the product of the baseline of the stereo image capture device 107 and the focal length of the lenses of the stereo image capture device 107 divided by the distance between the position of the moving image capture device 105 when a first image is captured and the position of the moving image capture device 105 when a second image is captured. In one embodiment, the first image and second image are consecutive images. However, because the distance between the position of the moving image capture device 105 when the first image is captured and when the second image is captured is unknown, the disparity determination module 156 initially selects a predetermined value for the scale and uses the predetermined value to calculate an error associated with the scale. The disparity determination module 156 subsequently modifies the scale to minimize the error. Calculation of the stereo disparity, motion disparity and scale is further described below in conjunction with FIG. 5.

The color segmentation module 158 includes computer executable code, such as data or instructions, that, when executed by the processor 110, partition an image into segments. In one embodiment, the color segmentation module 158 applies a "mean shift" process to an image from the stereo image capture device 107 or from the moving image capture device 105. The mean shift process associates a three-dimensional color vector and a two-dimensional location with multiple pixels in an image. Hence, the mean shift process converts an image into a plurality of points in a five-dimensional space from which maxima are determined using an initial estimate. A kernel function modifies the weighting of points to re-estimation of the mean. Various kernel functions or initial estimates may be used in different embodiments of the color segmentation module 158. However, in other embodiments of the color segmentation module 158, a different process may be used for clustering data to segment received images from the moving image capture device 105 or from the stereo image capture device 107.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 150, 152, 154, 156, 158) may be positioned in close proximity to each other while in other embodiments these components may be positioned in geographically distant locations. For example the modules in memory 140 may be programs capable of being executed by one or more processors 110 located in separate computing devices 100.

Figure 2:
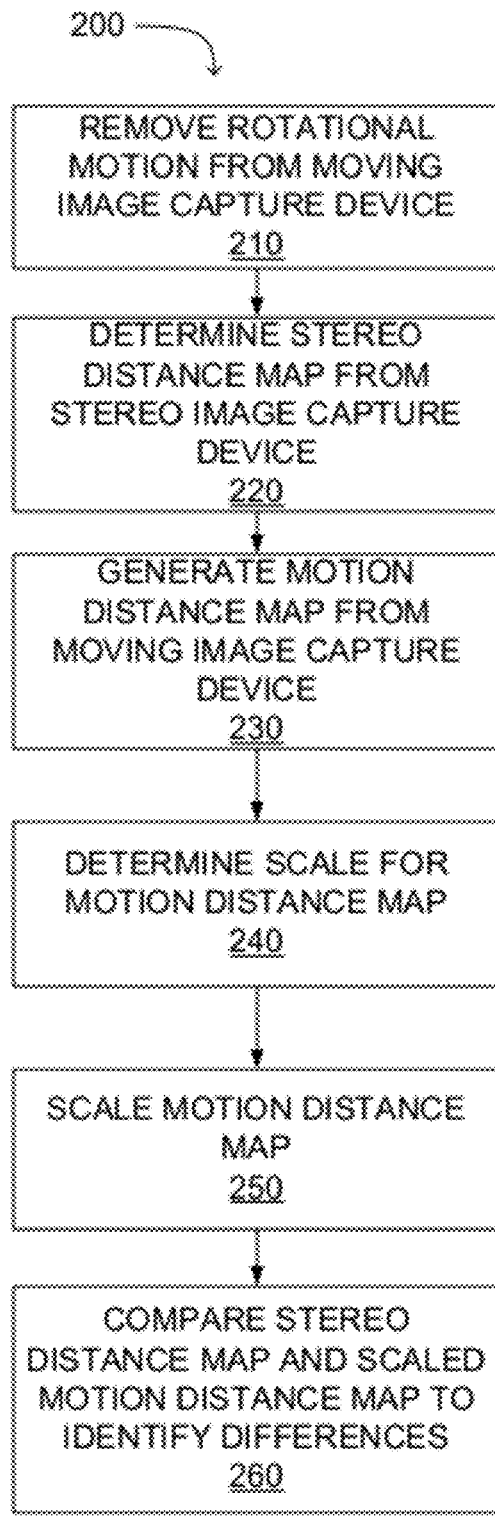
FIG. 2 is a flowchart of a method for moving object detection according to one embodiment of the present invention.

FIG. 2 is a flowchart of one embodiment of a method 200 for detecting one or more moving objects from image date. In an embodiment, the steps of the method 200 are implemented by the processor 110 executing software or firmware instructions that cause the described actions, such as instructions stored in a memory 140 or other computer readable storage medium. Those of skill in the art will recognize that one or more steps of the method 200 may be implemented in embodiments of hardware and/or software or combinations thereof. Furthermore, those of skill in the art will recognize that other embodiments can perform the steps of FIG. 2 in different orders and additional embodiments can include different and/or additional steps than the ones described here.

A computing device 100 receives images from the moving image capture device 105 and from the stereo image capture device 107 and a processor 110 included in the computing device 100 executes computer executable code, such as data or instructions stored in a motion determination module 152, to remove 210 rotational motion from images received from the moving image capture device 105 while preserving translational motion in the images received from the moving image capture device 105. By removing 210 rotational motion from captured images, moving objects are more accurately detected using images from the moving image capture device 105. Removing 210 rotational motion from images received from the moving image capture device 105 generates one or more rotation-cancelled images where motion caused by movement of the moving image capture device 105 is removed 210. One embodiment of a method for removing 210 of motion from images received from the moving image capture device 105 is further described below in conjunction with FIG. 3.

Using images received from the stereo image capture device 107, the computing device 100 determines 220 a stereo distance map. In one embodiment, block matching is used to determine 220 the difference between the location of an object in a first image captured by a first image capture device included in the stereo image capture device 107 and the location of the object in a second image captured by a second image capture device included in the stereo image capture device 107. Differences in the position of the object between images captured by different image capture devices included in the stereo image capture device 107 allow triangulation of the object's distance from the stereo image capture device 107. Distances from the stereo image capture device 107 to various objects are computed and stored to determine 220 the stereo distance map.

A motion distance map is generated 230 from the one or more rotation-cancelled images to reconstruct distance to one or more objects from image motion. Instructions from the optical flow determination module 154 are executed by the processor 110 to generate an optical flow map from consecutive images captured from the moving image capture device 105. The optical flow map associates motion vectors with a plurality of pixels in images captured by the moving image capture device 105. For example, the optical flow map includes a motion vector associated with each pixel in the image captured by the moving image capture device 105.

A horizontal component or a vertical component of the optical flow calculated from a pair of rotation-cancelled images is used to determine a distance from the moving image capture device 105 to a stationary object. However, using the horizontal component of optical flow to calculate distance causes large errors proximate to a vertical line passing through a focus of expansion of the rotation-cancelled images. Similarly, computing distance using the vertical component of optical flow creates large errors proximate to a horizontal line passing through the focus of expansion of the rotation-cancelled images. As indicated above, the focus of expansion of an image is the point in the image from which a majority of image motion trajectories of the optical flow originate or a point in the image where a majority of image motion trajectories of the optical flow end.

The motion distance map generated 230 from the rotation-cancelled images comprises a weighted sum of a distance map calculated from the horizontal component of optical flow from a pair of rotation-cancelled images ("a horizontal distance map") and a distance map obtained from the vertical component of optical flow calculated from the pair of rotation-cancelled images ("a vertical distance map"). Horizontal weights are associated with different pixels in the horizontal distance map and vertical weights are associated with different pixels in the vertical distance map. The horizontal weights associated with the horizontal distance map and the vertical weights associated with the vertical distance map are selected to minimize erroneous regions in the respective distance maps.

Horizontal weights associated with pixels in the horizontal distance map proximate to a vertical line passing through the focus of expansion have a smaller value than pixels in the horizontal distance map having a greater distance from the vertical line passing through the focus of expansion. Similarly, vertical weights associated with pixels in the vertical distance map proximate to a horizontal line passing through the focus of expansion have a smaller value than pixels in the vertical distance map having a greater distance from the horizontal line passing through the focus of expansion. The motion distance map is generated 230 from a sum of the horizontal distance map multiplied by the horizontal weights and the vertical distance map multiplied by the vertical weights. An embodiment of a method for generating 230 of the motion distance map is further described below in conjunction with FIG. 4.

However, distances determined using the motion distance map become less accurate as the distances equal or exceed a scale value which is determined 240 using images from the stereo image capture device 107 and from the moving image capture device 105. To determine 240 the scale, a stereo disparity, or a stereo distance, is computed for multiple pixels in an image capture by the stereo image capture device 107. The stereo disparity and the stereo distance are related according to:

$$Z = \frac{B \cdot f}{d}$$

where:

Z=the stereo distance,

B=the baseline, or distance between the optical centers of two lenses included in the stereo image capture device 107, f=the focal length of the lenses of included in the stereo image capture device and d=the stereo disparity Similarly, a motion disparity or a motion distance is computed for multiple pixels in a pair of images captured by the moving image capture device 105. The motion disparity and the motion distance are related as follows:

$$\tilde{d} = \frac{T}{Z}$$

Where:

Z=motion distance,

T=distance between a position of the moving image capture device 105 when a first image is captured and a position of the moving image capture device when a second image is captured and $\tilde{d}$=motion disparity.

The scale associated with the motion distance map is then determined 240 by selecting an initial value for the scale and calculating an error between the stereo disparity, or the stereo distance, associated with an image pixel and the product of the scale and the motion disparity, or the motion distance, associated with the pixel. This difference is calculated for multiple pixels within the image and a median error is determined using the error associated with different pixels within the image. The median error is stored and associated with the initial value. The scale is then modified from the initial value. Using the modified scale, the error between stereo disparity and the product of the scale and motion disparity is again computed for various pixels and the median error is computed and associated with the modified scale. The scale is modified until a minimum median error is calculated. The scale associated with the minimum median error is then determined 240 and associated with the motion distance map. In one embodiment, the motion distance map is modified to offset removal 210 of the rotational motion and the modified motion distance map is used to determine 240 the scale. Embodiments of methods for determining 240 the scale is further described below in conjunction with FIGS. 5 and 6.

The determined scale is then used to scale 250 the motion distance map. For example, the motion distance map is multiplied by the determined scale value. In one embodiment, the motion distance map is modified to offset removal 210 of the rotational motion and the modified motion distance map is scaled 250 using the determined scale. For multiple pixels in an image, the difference between the stereo disparity associated with a pixel and the product of the determined scale and the motion disparity associated with the pixel is computed. The difference is compared to a threshold and if the difference equals or exceeds the threshold, the pixel is associated with a moving object. For example, a pixel is associated with a moving object when:

$$|d - \alpha^* \tilde{d}| \geq c$$

Where:

d=stereo disparity associated with the pixel, a*=determined scale value $\tilde{d}$=motion disparity associated with the pixel and c=threshold value.

In one embodiment, the accuracy of the stereo disparity and/or the motion disparity are estimated and used to specify the threshold. For example, if the stereo disparity or the motion disparity is noisy, the threshold is set to a large value to avoid erroneously identifying a stationary region as a moving object.

Determining 240 the scale between the stereo distance map and the motion distance map allows more accurate detection of small moving objects than conventional moving object detection techniques. Further, many conventional techniques for moving obstacle detection rely on identifying the shape of detected objects, making it difficult for these techniques to detect obstacles having different shapes. However, the method 200 allows identification of moving objects having a variety of shapes.

Figure 3:
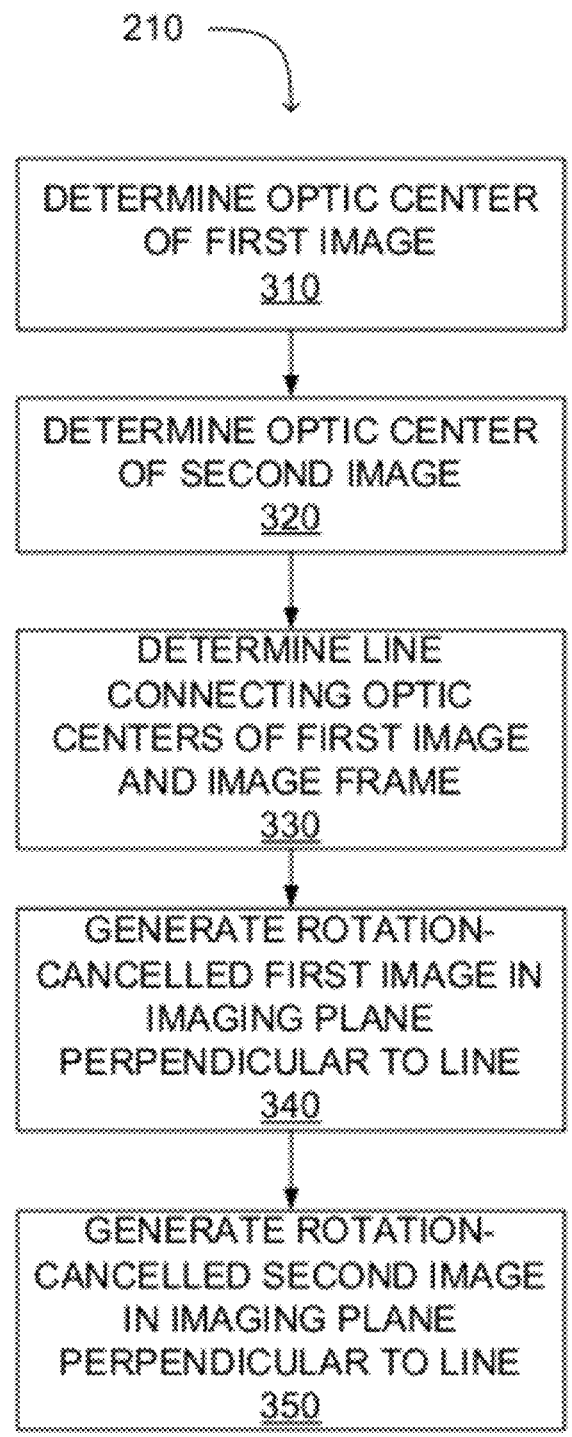
FIG. 3 is a flowchart of a method for removing rotational motion from captured images according to one embodiment of the present invention.

FIG. 3 is a flowchart of one embodiment of a method for removing 210 rotational motion from captured images. In the embodiment shown by FIG. 3, a generated imaging plane differing from the imaging plane of the moving image capture device 105 is used to generate rotation-cancelled images. For example, the images from which rotational motion is removed 210 are frames of video data captured by the moving image capture device 105 projected onto the generated imaging plane.

In an embodiment, the steps of the method for rotational motion removal 210 are implemented by the processor 110 executing software or firmware instructions that cause the described actions, such as instructions stored in a computer-readable storage medium, such as the memory 140 or, the motion determination module 152. Those of skill in the art will recognize that one or more steps of the method for removing 210 rotational motion may be implemented in embodiments of hardware and/or software or combinations thereof. Furthermore, those of skill in the art will recognize that other embodiments can perform the steps of FIG. 3 in different orders and additional embodiments can include different and/or additional steps than the ones described here.

After receiving a first image and a second image from the moving image capture device 105, an optic center of the first image is determined 310 and an optic center of the second image is determined 320. For example, the first image and the second image are consecutive frames of video data captured by the moving image capture device 105. In one embodiment, the optic center of the first image and the optic center of the second image are determined 310, 320 using an ego-motion estimation process which estimates relative motion of the moving image capture device 105. The relative motion estimated by the ego-motion estimation process includes rotational motion and translational motion of the moving image capture device 105. The relative position of the optic centers of the first image and the second image are determined 310, 320 from the motion estimated by the ego-motion estimation process. Different embodiments may use various ego-motion estimation processes to calculate image motion and properties of motion field equations for determining moving image capture device 105 motion.

After determining 310, 320 the optic center of the first image and the optic center of the second image, a line connecting the optic center of the first image and the optic center of the second image is determined 330. In one embodiment, the optic center of the first image is the origin of a coordinate system associated with the first image and the ego-motion process used to determine 320 the optic center of the second image determines the location of the optic center of the second image relative to the first image. A line passing through the optic center of the first image and the optic center of the second image is then determined 330. An imaging plane perpendicular to the line passing through the optic center of the first image and the optic center of the second image is determined and used to generate 340 a rotation-cancelled first image and to generate 350 a rotation-cancelled second image.

In one embodiment, the rotation-cancelled first image is generated 340 by computationally reprojecting the first image to the imaging plane perpendicular to the line passing through the optic center of the first image and the optic center of the second image. Similarly, the rotation-cancelled second image may be generated 350 by computationally reprojecting the second image to the imaging plane perpendicular to the line passing through the optic center of the first image and the optic center of the second image. The rotation-cancelled first image and the rotation-cancelled second image remove motion caused by rotation of the moving image capture device 105 while including translational motion, allowing the translational motion between the first image and the second image to be used for detection of moving objects from the images while reducing the likelihood of incorrectly identifying a stationary object as a moving object. In one embodiment, rotation-cancelled images are generated 340, 350 for multiple pairs of images captured by the moving image capture device 105, such as for a plurality of pairs of consecutive images from a video stream.

Figure 7A:
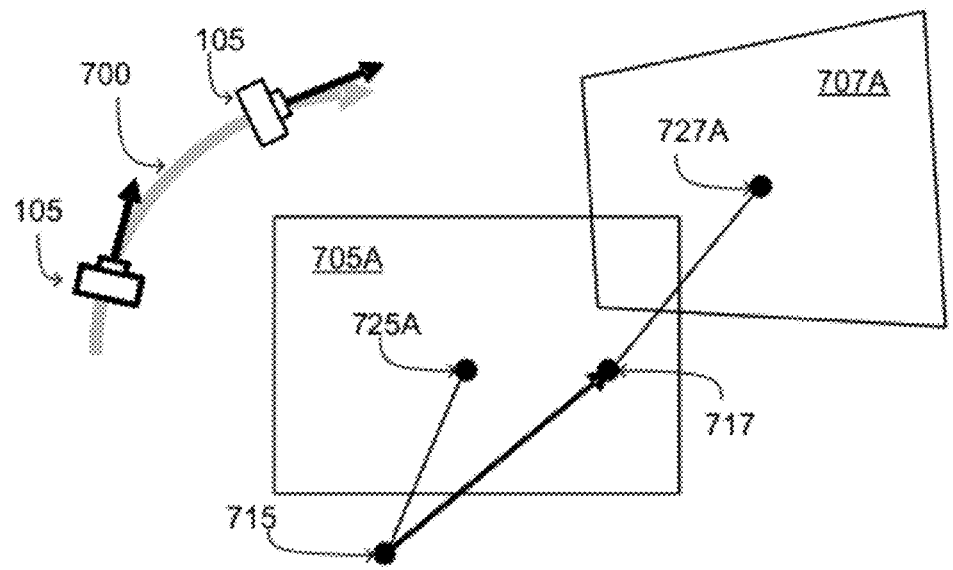
FIGS. 7A and 7B show one example of removing rotational motion from a pair of images captured by a moving image capture device according to one embodiment of the present invention.
Figure 7B:
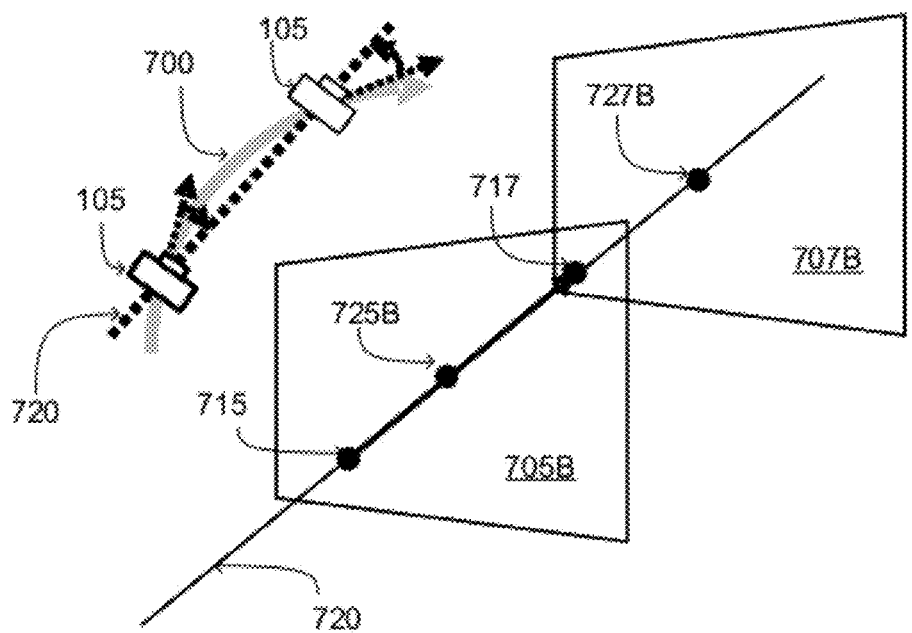

FIGS. 7A and 7B show an example application of the method for removing 210 rotational motion. In the example shown by FIGS. 7A and 7B, the moving image capture device 105 moves along a motion path 700, introducing rotational motion between a first image 705A and a second image 705B captured by the moving image capture device 105. The optical center of the first image 715 and the optical center of the second image 717 are determined 310, 320 using an ego-motion process. For purposes of illustration, FIG. 7A also identifies the focus of expansion of the first image 725A and the focus of expansion of the second image 727A.

After determining 310, 320 the optical center of the first image 715 and the optical center of the second image 717, a line 720 connecting the optical center of the first image 715 and the optical center of the second image 717 is determined. As shown in FIG. 7B, the line 720 connects the position of the optical center of the moving image capture device 105 when the first image 705A is captured and the position of the optical center of the moving image capture device 105 when the second image 707A is captured. An imaging plane perpendicular to the line 720 is determined and a rotation-cancelled first image 705B and a rotation-cancelled second image 707B are generated 340, 350 by reprojecting the first image 705A and the second image 707B into the imaging plane perpendicular to the line.

FIG. 7B shows that the focus of expansion of the first rotation-cancelled image 725B and the focus of expansion of the second rotation-cancelled image 727B are both positioned along the determined line 720, which reduces the effect of rotational motion from movement of the moving image capture device 105 along the motion path 700. Using the rotation-cancelled first image 705B and the rotation-cancelled second image 705B to identify moving objects results in fewer false positives where a stationary object is identified as a moving object.

Figure 4:
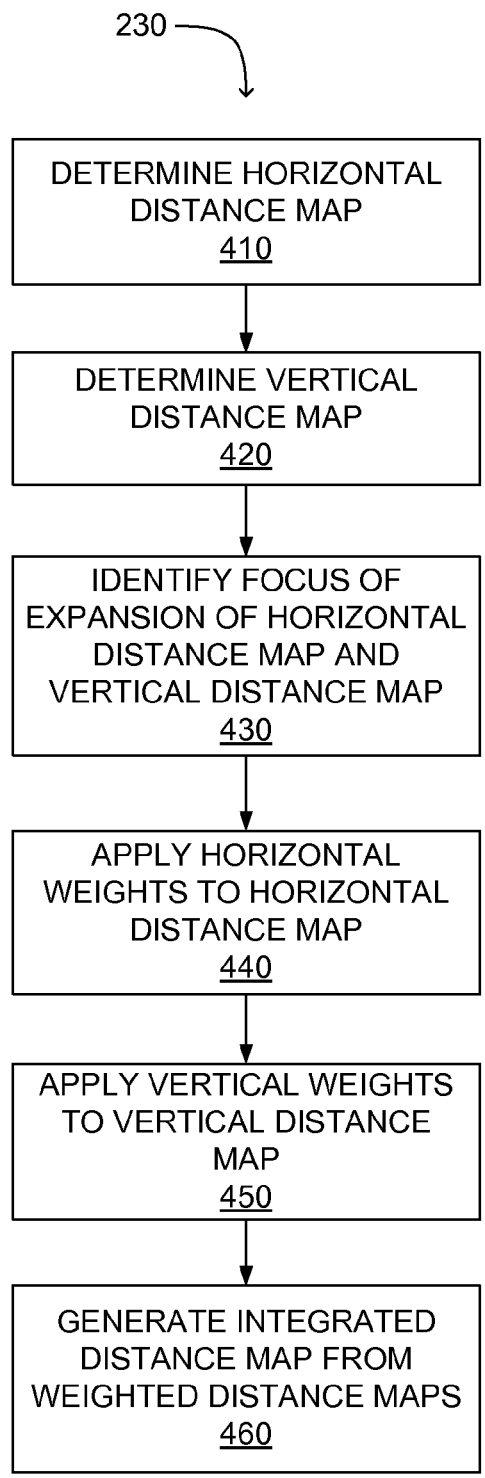
FIG. 4 is a flowchart of a method for generating a distance map from images captured by a moving image capture device according to one embodiment of the present invention.

FIG. 4 is a flowchart of one embodiment of a method for generating 230 a distance map from data captured by the moving image capture device 105, also referred to as a "moving distance map." Those of skill in the art will recognize that one or more steps of the method for generating 230 the moving distance map may be implemented in embodiments of hardware and/or software or combinations thereof. In an embodiment, the steps of the method for generating 230 the moving distance map are implemented by the processor 110 executing software or firmware instructions that cause the described actions, such as instructions stored in a computer-readable storage medium, such as the memory 140 or the motion moving obstacle detection module 150. Furthermore, those of skill in the art will recognize that other embodiments can perform the steps of FIG. 4 in different orders and that additional embodiments can include different and/or additional steps than the ones described here.

The distance from the moving image capture device 105 to a stationary object is determined from a horizontal component or a vertical component of scaled image motion. In one embodiment, the horizontal component or the vertical component of an optical flow vector associated with a pixel is used to determine the distance from the moving image capture device 105 to an object associated with the pixel. Multiple pixels in an image are associated with a two-dimensional optical flow vector having a horizontal component and a vertical component. To generate 230 the moving distance map, a horizontal distance map is determined 410 from the horizontal component of the optical flow vector associated with multiple pixels. In one embodiment, the horizontal component of a vector associated with each pixel in an image is used. Hence, an optical flow between a first image captured by the moving image capture device 105 and a second image captured by the moving image capture device 105 is calculated and the horizontal component of the optical flow associated with multiple pixels is used to determine 410 the horizontal distance map. In one embodiment, rotational motion is removed from the first image and from the second image, as described above in conjunction with FIG. 3, and the rotation-cancelled images are used to calculate the optical flow. Horizontal distances are determined from the horizontal component of the optical flow according to:

$$Z = T\frac{x}{v_x}$$

where:
Z=distance from the moving image capture device 105 to an object associated with a pixel located at position (x,y) within the image,
T=distance between a position of the moving image capture device 105 when a first image is captured and a position of the moving image capture device when a second image is captured,
x=horizontal location of the pixel within the image and
$v_x$=horizontal component of the optical flow associated with the pixel at horizontal location x.

Hence, the horizontal distance map includes distances associated with multiple pixels in the image determined from the horizontal component of the optical flow, so the horizontal distance map describes the distance from the moving image capture device 105 to objects associated with various pixels within the image.

Similarly, a vertical distance map is determined 420 from the vertical component of the optical flow. From the optical flow between the first image and the second image captured by the moving image capture device 105, distances comprising in the vertical distance map are determined according to:

$$Z = T\frac{y}{v_y}$$

where:
Z=distance from the moving image capture device 105 to an object associated with a pixel located at position (x,y) within the image, T=distance between a position of the moving image capture device 105 when a first image is captured and a position of the moving image capture device when a second image is captured, y=vertical location of the pixel within the image and $v_y$=vertical component of the optical flow associated with the pixel at vertical location y.

Thus, the vertical distance map includes distances associated with multiple objects associated with pixels in the image based on the vertical component of optical flow.

However, the distance calculated from the horizontal component of the optical flow is inaccurate for objects associated with pixels proximate to a vertical line passing through the focus of expansion of the image. Similarly, the distance calculated from the vertical component of the optical flow is inaccurate for objects associated with pixels proximate to a horizontal line passing through the focus of expansion of the image. The focus of expansion of an image is a point in the image from which a majority of image motion trajectories of the optical flow originate or a point in the image where a majority of image motion trajectories of the optical flow end. Hence, the focus of expansion of the horizontal distance map and the focus of expansion of the vertical distance map are identified 430. Both the horizontal distance map and the vertical distance map have the same focus of expansion, which, in one embodiment, is identified using ego-motion estimation.

To mitigate inaccuracies in the distances associated with points in the horizontal map proximate to the vertical line passing through the focus of expansion, a set of horizontal weights are applied 440 to distances from the horizontal distance map. The set of horizontal weights has a relative minimum value at the position of a vertical line intersecting the focus of expansion. Additionally, the horizontal weights associated with points proximate to the vertical line passing through the focus of expansion have smaller values than the horizontal weights associated with pixels having a larger distance from the vertical line passing through the focus of expansion. In one embodiment, a horizontal weight, $w_x$, associated with a pixel in the horizontal distance map at location x, is determined using:

$$w_x(x, y) = 1 - \exp\left(-\frac{(x - e_x)}{2\sigma^2}\right)$$

where:

x=horizontal position of a pixel, $e_x$=horizontal position of the focus of expansion and σ=standard deviation of a location including a significant error from the horizontal distance map and the vertical distance map.

In one embodiment, a location, or group of pixels, including a significant error used to determine the standard deviation, a, is determined by measuring the maximum vertical range for the location from the horizontal distance map and the maximum horizontal range for the location using the vertical distance map. In one embodiment, the set of horizontal weights has a Gaussian distribution, so the standard deviation of the Gaussian distribution is calculated so that the minimum values of the set of horizontal weights correspond to a size of the location including the significant error, minimizing the effect of the significant error. For example, the horizontal distance map includes a location of 40 pixels having a maximum vertical range and the vertical distance map includes a location of 40 pixels having a maximum horizontal range; hence, the standard deviation is calculated so that the Gaussian distribution of the set of horizontal weights has a width of 40 pixels. Because the width of the Gaussian distribution is approximately 3σ, the standard deviation in this example is 40/3 pixels.

Similarly, a set of vertical weights are applied 450 to distances associated with pixels in the vertical distance map to mitigate inaccuracies in the distances of the vertical map proximate to a horizontal line passing through the focus of expansion. The set of vertical weights includes a relative minimum at the position of a horizontal line intersecting the focus of expansion. Additionally, the vertical weights associated with pixels proximate to the horizontal line passing through the focus of expansion have smaller values than the vertical weights associated with pixels having a greater distance from the horizontal line passing through the focus of expansion. In one embodiment, a vertical weight, $w_y$, associated with a pixel in the horizontal distance map at location y, is determined using:

$$w_y(x, y) = 1 - \exp\left(-\frac{(y - e_y)}{2\sigma^2}\right)$$

where:

y=vertical position of the pixel, $e_y$=vertical position of the focus of expansion and σ=standard deviation of a location including a significant error from the horizontal distance map and the vertical distance map, which is calculated as described above with respect to the set of horizontal weights.

Figure 8:
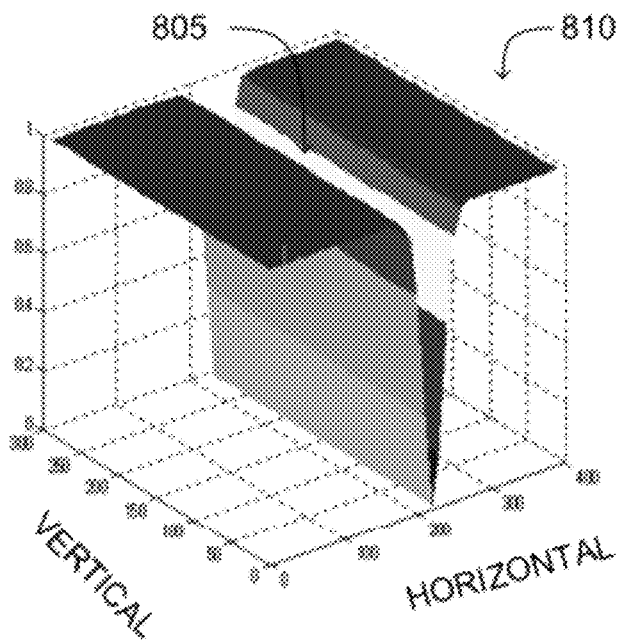
FIG. 8 illustrates an example set of horizontal weights and an example set of vertical weights according to one embodiment of the present invention.
Figure 8:
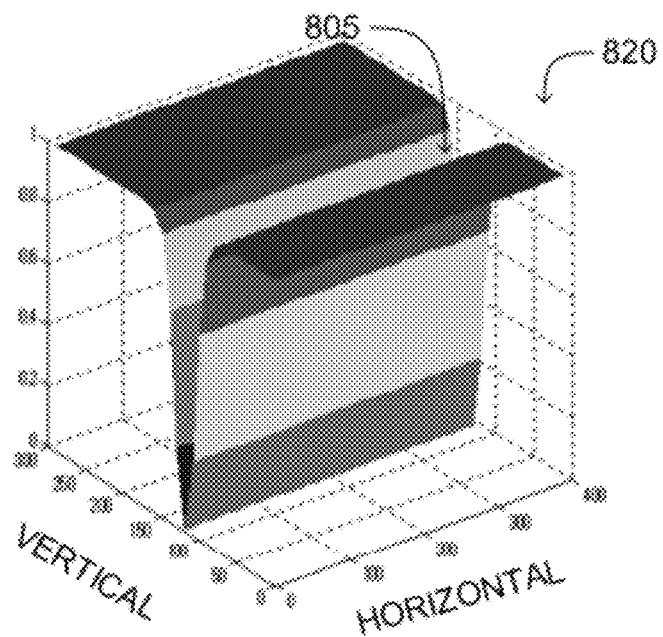

FIG. 8 graphically illustrates an example set of horizontal weights 810 and an example set of vertical weights 820. As shown in FIG. 8, the example set of horizontal weights 810 has a Gaussian distribution with a minimum located along a vertical line intersecting the focus of expansion 805. The horizontal weights 810 increase as the distance from the vertical line intersecting the focus of expansion 805. In the example of FIG. 8, the horizontal weights reach a maximum at a distance of 3σ from the vertical line intersecting the focus of expansion 805.

Similarly, the set of vertical weights 820 shown in FIG. 8 has a Gaussian distribution with a minimum located along a horizontal line intersecting the focus of expansion 805. Like the horizontal weights 810, the vertical weights 820 increase as the distance from the horizontal line intersecting the focus of expansion 805 increases. In the example of FIG. 8, the vertical weights 820 reach a maximum at a distance of 3σ from the horizontal line intersecting the focus of expansion 805.

After applying 440 the set of horizontal weights to the horizontal distance map and applying 450 the set of vertical weights to the vertical distance map, an integrated distance map is generated 460 by combining the weighted horizontal distance map and the weighted vertical distance map. In one embodiment, the distance in the integrated distance map associated with a pixel at the location (x,y) is generated by:

$$Z(x, y) = \frac{w_x(x, y) \cdot Z_x(x, y) + w_y(x, y) \cdot Z_y(x, y)}{w_x(x, y) + w_y(x, y)}$$

where:

$w_x(x,y)$=horizontal weight associated with the pixel at location (x,y), $Z_x(x,y)$=distance from the horizontal distance map associated with the pixel at location (x,y), $w_y(x,y)$=vertical weight associated with the pixel at location (x,y) and $Z_y(x,y)$=distance from the vertical distance map associated with the pixel at location (x,y)

Thus, in one embodiment, the distances included in the integrated distance map are generated 460 by weighting the distance of associated with a pixel from the horizontal distance map using the horizontal weight associated with the pixel and weighting the distance of the pixel from the vertical distance map using the vertical weight associated with the pixel. The weighted distances from the horizontal distance map and from the vertical distance map are summed and the result associated with the point in the integrated distance map. Application of the set of horizontal weights and the set of vertical weights to the horizontal distance map and the vertical distance map, respectively, allows the integrated distance map to minimize the effect of erroneous regions in either the horizontal distance map or the vertical distance map.

Figure 5:
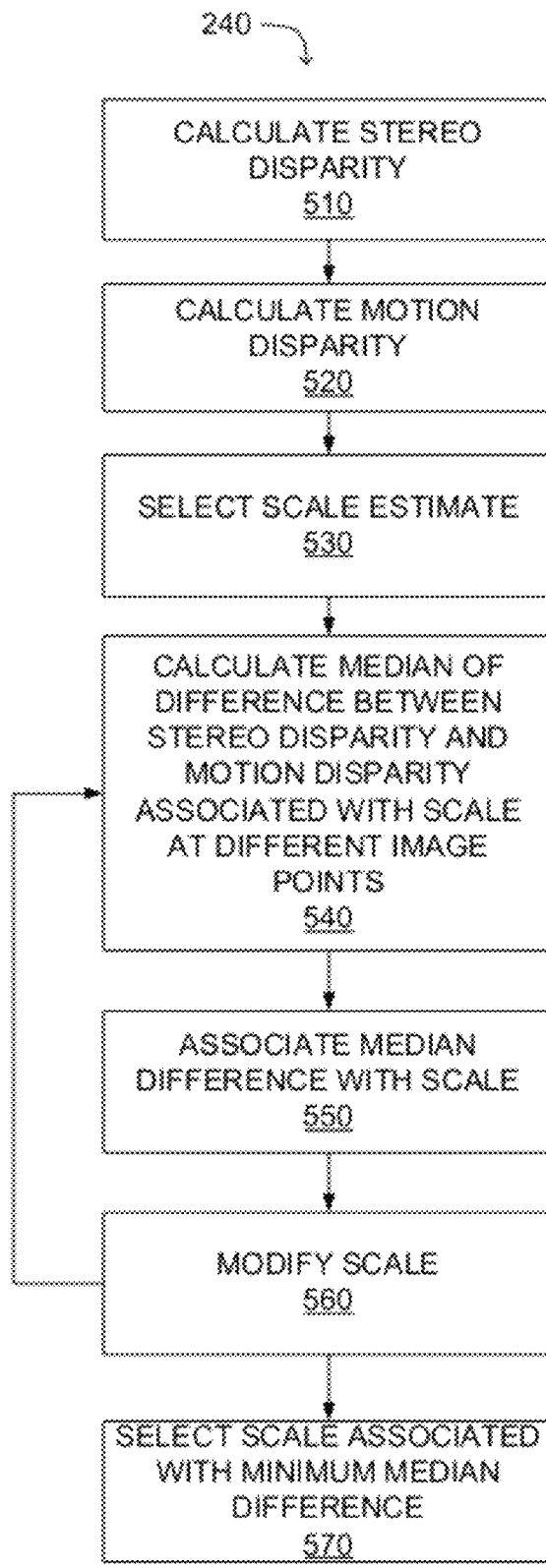
FIG. 5 is a flowchart of a method for determining a scale of an image captured by a moving image capture device according to one embodiment of the present invention.

FIG. 5 is a flowchart of one embodiment of a method for determining 240 a scale associated with an image captured by a moving image capture device 105. Those of skill in the art will recognize that one or more steps of the method for determining 240 the scale may be implemented in embodiments of hardware and/or software or combinations thereof. In an embodiment, the steps of the method for determining 240 the scale are implemented by the processor 110 executing software or firmware instructions that cause the described actions, such as instructions stored in a computer-readable storage medium, such as the memory 140 or the motion moving obstacle detection module 150. Furthermore, those of skill in the art will recognize that other embodiments can perform the steps of FIG. 5 in different orders and that additional embodiments can include different and/or additional steps than the ones described here.

Pixels within the field of view of the moving image capture device 105 and the stereo image capture device 107 are identified by differences between a distance from the moving image capture device 105 to the an object associated with a pixel and a distance from the stereo image capture device 107 to the object associated with a pixel. However, a scale associated with the moving image capture device 105 limits the accuracy of distances determined using the moving image capture device 105. In one embodiment, rather than use the distance to from the moving image capture device 105 to an object associated with a pixel and the distance from the stereo image capture device 107 to an object associated with a pixel to identify moving objects, the disparity determination module 156 calculates 510 a stereo disparity associated with the pixel and calculates 520 a motion disparity associated with the pixel.

The stereo disparity associated with a pixel is calculated 520 using the distance from the stereo distance map. In one embodiment, the stereo disparity is calculated 520 using:

$$d = \frac{B \cdot f}{Z}$$

where:
  d=the stereo disparity,
  Z=the stereo distance from the stereo distance map,
  B=the baseline of the stereo image capture device 107, or distance between the optical centers of two lenses included in the stereo image capture device 107 and f=the focal length of the lenses of included in the stereo image capture device 107.

In one embodiment, the disparity determination module 156 calculates 520 the motion disparity associated with a pixel using the optical flow calculated by the optical flow determination module 154. Alternatively, the disparity determination module 156 uses distances from the integrated distance map, described above in conjunction with FIG. 4, to calculate 520 the motion disparity associated with a pixel. In one embodiment, the disparity determination module 156 modifies the integrated distance map to offset image modification removing 210 rotational motion from images captured by the moving image capture device 105. The disparity determination module 156 calculates the motion disparity associated with a point using:

$$\tilde{d} = \frac{T}{Z}$$

where:
  $\tilde{d}$=motion disparity.
  Z=motion distance,
  T=distance between a position of the moving image capture device 105 when a first image is captured and a position of the moving image capture device when a second image is captured, In one embodiment, the motion distance, Z, of a pixel located at $(x_2, y_2)$ is determined by:

$$Z = T\left(\frac{x_2 - c_x}{v_x}\right) = T\left(\frac{y_2 - c_y}{v_y}\right)$$

where:
  T=distance between a position of the moving image capture device 105 when a first image is captured and a position of the moving image capture device when a second image is captured. In one embodiment, T is estimated from the velocity of the moving image capture device 105, or the velocity of a system including the moving image capture device 105, and the time difference between capture of the first image and capture of the second image.
  $(v_x, v_y)$=optical flow associated with the pixel at location $(x_2, y_2)$
  $(c_x, c_y)$=horizontal and vertical coordinate of the focus of expansion.

The scale, $\alpha$, to be determined is defined with respect to the stereo disparity and the motion disparity as:

$$d = \alpha \tilde{d}$$

Hence, the scale, $\alpha$, is expressed in terms of the baseline, B, the focal length, f, and the distance the moving image capture device 105 moves between capturing a first image and a second image according to:

$$\alpha = \frac{B \cdot f}{T}$$

Because the distance between the position of the moving image capture device 105 when the first image is captured and the position of the moving image capture device 105 when the second image is captured is unknown, the scale is initially unknown, so a scale estimate is selected 530. In one embodiment, the initial scale value estimate is a predetermined value.

Alternatively, the distance traveled by the moving image capture device 105 between capture of the first image and capture of the second image is estimated from the velocity of the moving image capture device 105, or from the velocity of a system including the moving image capture device 105, and the time difference between the first image and the second image. The product of the stereo image capture device 107 baseline and focal length is divided by the estimated moving image capture device 105 distance change to select 530 the scale estimate.

For multiple pixels in an image, the scale estimate is used to calculate a difference between the stereo disparity associated with a pixel and the motion disparity associated with the pixel. The median of the differences between the stereo disparity and motion disparity for multiple pixels is calculated 540 and associated 550 with the scale estimate. For example, the difference between the stereo disparity and the motion disparity of a pixel, p, in an image is calculated using:

$$err_p = |d_p - \alpha \tilde{d}_p|$$

where:
$\tilde{d}_p$=motion disparity at pixel p,
$d_p$=stereo disparity at pixel p and
$\alpha$=scale Calculating 540 the median of the differences between stereo disparity and scaled motion disparity and associating the median with the scale value allows the moving obstacle detection module 150 to store data describing the median error between stereo disparity and scaled stereo disparity when different scales are applied to the motion disparity. The scale is then modified 560 and the modified scale is used to calculate 540 the median difference between stereo disparity and scaled motion disparity for multiple pixels in the image which is associated 550 with the modified scale and stored.

In one embodiment, modification 560 increases the scale by a fixed amount. The median difference between stereo disparity and motion disparity for various pixels in the image is calculated 540 using the increased scale. If the median value associated with the increased scale is less than the median value associated with the prior scale, the increased scale is again increased by the fixed amount. If the median value associated with the increased scale is greater than the median value associated with the prior scale, the scale is decreased by a second fixed amount, such as decreasing the scale by half of the fixed amount. In this embodiment, the scale is increased or decreased responsive to the effect of different scales on the median difference between stereo disparity and scaled motion disparity.

The scale associated with the minimum median difference between stereo disparity and motion disparity is then selected 570 from scales associated with stored median differences between stereo disparity and scaled motion disparity. The scale associated with the minimum stored median difference is subsequently used with the stereo disparity and motion disparity associated with a pixel in the image to determine whether the pixel is associated with a moving object. In one embodiment, the scale associated with the minimum median difference between stereo disparity and motion disparity, $\alpha^*$, allows identification of pixels associated with a moving object when:

$$|d - \alpha^* \tilde{d}| > c$$

Hence, when the difference between the stereo distance associated with a point, d, and the product of the selected scale, $\alpha^*$, and the motion distance, $\tilde{d}_p$, associated with a pixel exceeds a threshold value, c, the pixel is associated with a moving object. Using the median difference between stereo distance and motion distance improves the accuracy of scale selection by reducing errors caused by non-stationary objects.

Figure 6:
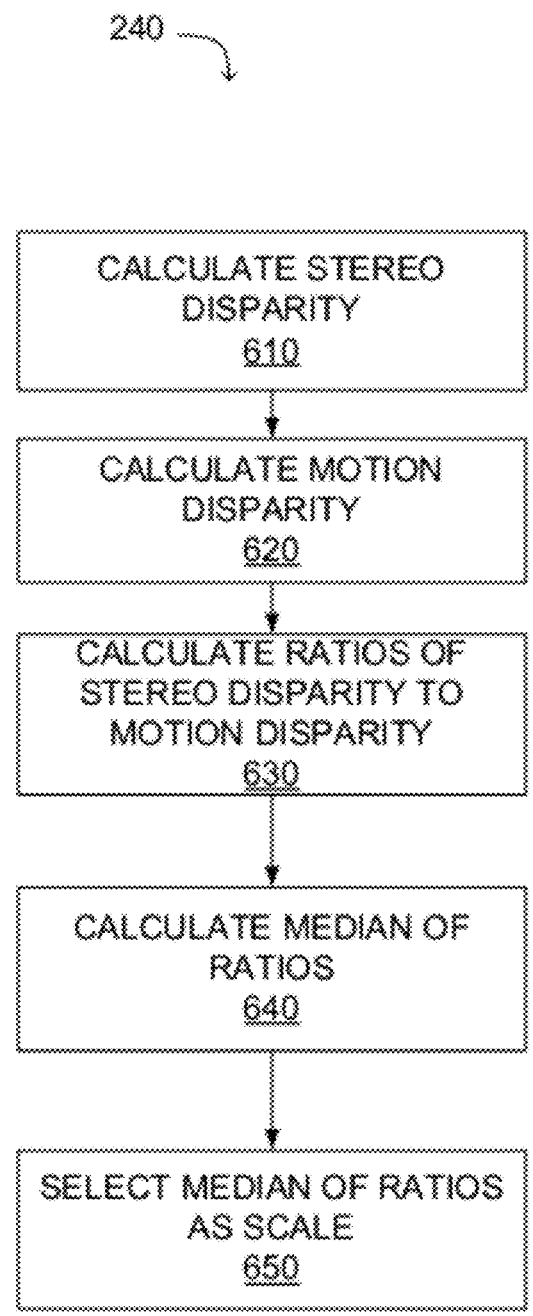
FIG. 6 is a flowchart of an alternative method for determining a scale of an image captured by a moving image capture device according to one embodiment of the present invention.

FIG. 6 is a flowchart of an alternative embodiment of a method for determining 240 a scale of an image captured by a moving image capture device 105. Those of skill in the art will recognize that one or more steps of the method for determining 240 the scale may be implemented in embodiments of hardware and/or software or combinations thereof. In an embodiment, the steps of the method for determining 240 the scale are implemented by the processor 110 executing software or firmware instructions that cause the described actions, such as instructions stored in a computer-readable storage medium, such as the memory 140 or the motion moving obstacle detection module 150. Furthermore, those of skill in the art will recognize that other embodiments can perform the steps of FIG. 6 in different orders and that additional embodiments can include different and/or additional steps than the ones described here.

Initially, the disparity determination module 156 calculates 610, 620 stereo disparity of various pixels within an image and the motion disparity of various pixels within the image as described above in conjunction with FIG. 5. For multiple pixels within the image, the ratio between a stereo disparity associated with a pixel and a motion disparity associated with the pixel is calculated 630. In one embodiment, the ratio, $R_p$, of stereo disparity and motion disparity at a pixel, p, is calculated 630 as:

$$R_p = \frac{d_p}{\tilde{d}_p}$$

where:
$d_p$=motion disparity at pixel p,
$d_p$=stereo disparity at pixel p and
The median of the ratios of motion disparity to stereo disparity at various pixels is calculated 640 and the median is selected 650 as the scale. In one embodiment, the median of the ratios accounts for each pixel in the image for which a ratio was calculated 630. Alternatively, the median of the ratios accounts for a subset of pixels in the image for which a ratio was calculated.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A system for determining distance to points from motion in captured images comprising:
 a moving image capture device capturing a first image and a second image;
 a processor coupled to the moving image capture device;
 a memory structured to store instructions executable by the processor, the instructions, when executed, cause the processor to execute steps of:
  determining a horizontal distance map including horizontal distances from the moving image capture device to a plurality of points determined from a horizontal component of an optical flow calculated from the first image and the second image;

determining a vertical distance map including vertical distances from the moving image capture device to the plurality of points determined from a vertical component of the optical flow calculated from the first image and the second image;

generating a modified horizontal distance map by applying a set of horizontal weights to the horizontal distance map, the set of horizontal weights attenuating horizontal distances associated with pixels in the horizontal distance map proximate to a vertical line intersecting a focus of expansion of the horizontal distance map;

generating a modified vertical distance map by applying a set of vertical weights to the vertical distance map, the set of vertical weights attenuating vertical distances associated with pixels in the vertical distance map proximate to a horizontal line intersecting a focus of expansion of the vertical distance map;

generating a distance map by combining the modified horizontal distance map and the modified vertical distance map; and storing the distance map in the memory.

2. The system of claim 1, wherein the set of horizontal weights have a minimum value at pixels located on a vertical line intersecting the focus of expansion of the horizontal distance map and have values which increase as a distance of a pixel from the vertical line intersecting the focus of expansion of the horizontal distance map increases.

3. The system of claim 2, wherein a horizontal weight associated with a pixel, (x,y) in the horizontal distance map comprises $$w_x(x, y) = 1 - \exp\left(-\frac{(x - e_x)}{2\sigma^2}\right)$$

wherein $e_x$ comprises the focus of expansion of the horizontal distance map and $\sigma$ comprises a standard deviation.

4. The system of claim 3, wherein the standard deviation is determined from a maximum vertical range of a region of the horizontal distance map.

5. The system of claim 4, wherein the standard deviation is one-third the maximum vertical range of the region of the horizontal distance map.

6. The system of claim 1, wherein the set of vertical weights have a minimum value at pixels located on a horizontal line intersecting the focus of expansion of the vertical distance map and has values which increase as a distance of a pixel from the horizontal line intersecting the focus of expansion of the vertical distance map increases.

7. The system of claim 5, wherein a vertical weight associated with a pixel, (x,y) in the vertical distance map comprises $$w_y(x, y) = 1 - \exp\left(-\frac{(y - e_y)}{2\sigma^2}\right)$$

wherein $e_y$ comprises the focus of expansion of the vertical distance map and $\sigma$ comprises a standard deviation.

8. The system of claim 7, wherein the standard deviation is determined from a maximum horizontal range of a region of the vertical distance map.

9. The system of claim 8, wherein the standard deviation is one-third the maximum horizontal range of the region of the vertical distance map.

10. The system of claim 1, wherein the focus of expansion of the horizontal distance map and the focus of expansion of the vertical distance map comprise a single focus of expansion.

11. A method for determining distance to points from motion in captured images comprising:

receiving a first image and a second image from a moving image capture device;

determining a horizontal distance map including horizontal distances from the moving image capture device to a plurality of points determined from a horizontal component of an optical flow calculated from the first image and the second image;

determining a vertical distance map including vertical distances from the moving image capture device to the plurality of points determined from a vertical component of the optical flow calculated from the first image and the second image;

generating a modified horizontal distance map by applying a set of horizontal weights to the horizontal distance map, the set of horizontal weights attenuating horizontal distances associated with pixels in the horizontal distance map proximate to a vertical line intersecting a focus of expansion of the horizontal distance map;

generating a modified vertical distance map by applying a set of vertical weights to the vertical distance map, the set of vertical weights attenuating vertical distances associated with pixels in the vertical distance map proximate to a horizontal line intersecting a focus of expansion of the vertical distance map;

generating a distance map by combining the modified horizontal distance map and the modified vertical distance map; and storing the distance map in a computer-readable storage device.

12. The method of claim 11, wherein the set of horizontal weights have a minimum value at pixels located on a vertical line intersecting the focus of expansion of the horizontal distance map and has values which increase as a distance of a pixel from the vertical line intersecting the focus of expansion of the horizontal distance map increases.

13. The method of claim 12, wherein a horizontal weight associated with a pixel, (x,y) in the horizontal distance map comprises $$w_x(x, y) = 1 - \exp\left(-\frac{(x - e_x)}{2\sigma^2}\right)$$

wherein $e_x$ comprises the focus of expansion of the horizontal distance map and $\sigma$ comprises a standard deviation.

14. The method of claim 13, wherein the standard deviation is determined from a maximum vertical range of a region of the horizontal distance map.

15. The method of claim 14, wherein the standard deviation is one-third the maximum vertical range of the region of the horizontal distance map.

16. The method of claim 11, wherein the set of vertical weights have a minimum value at pixels located on a horizontal line intersecting the focus of expansion of the vertical distance map and has values which increase as a distance of a pixel from the horizontal line intersecting the focus of expansion of the vertical distance map increases.

17. The method of claim 15, wherein a vertical weight associated with a pixel, (x,y) in the vertical distance map comprises $$w_y(x, y) = 1 - \exp\left(-\frac{(y - e_y)}{2\sigma^2}\right)$$

wherein $e_y$ comprises the focus of expansion of the vertical distance map and $\sigma$ comprises a standard deviation.

18. The method of claim 17, wherein the standard deviation is determined from a maximum horizontal range of a region of the vertical distance map.

19. The method of claim 18, wherein the standard deviation is one-third the maximum horizontal range of the region of the vertical distance map.

20. The method of claim 11, wherein the focus of expansion of the horizontal distance map and the focus of expansion of the vertical distance map comprise a single focus of expansion.

21. A non-transitory computer-readable storage medium structured to store instructions executable by a processor in a computing device, the instructions, when executed, cause the processor to execute steps of:
    receiving a first image and a second image from a moving image capture device;
    determining a horizontal distance map including horizontal distances from the moving image capture device to a plurality of points determined from a horizontal component of an optical flow calculated from the first image and the second image;
    determining a vertical distance map including vertical distances from the moving image capture device to the plurality of points determined from a vertical component of the optical flow calculated from the first image and the second image;
    generating a modified horizontal distance map by applying a set of horizontal weights to the horizontal distance map, the set of horizontal weights attenuating horizontal distances associated with pixels in the horizontal distance map proximate to a vertical line intersecting a focus of expansion of the horizontal distance map;
    generating a modified vertical distance map by applying a set of vertical weights to the vertical distance map, the set of vertical weights attenuating vertical distances associated with pixels in the vertical distance map proximate to a horizontal line intersecting a focus of expansion of the vertical distance map;
    generating a distance map by combining the modified horizontal distance map and the modified vertical distance map; and
    storing the distance map in a computer-readable storage device.

22. The non-transitory computer-readable storage medium of claim 21, wherein the set of horizontal weights have a minimum value at pixels located on a vertical line intersecting the focus of expansion of the horizontal distance map and have values which increase as a distance of a pixel from the vertical line intersecting the focus of expansion of the horizontal distance map increases.

23. The non-transitory computer-readable storage medium of claim 22, wherein a horizontal weight associated with a pixel, (x,y) in the horizontal distance map comprises:

$$w_x(x, y) = 1 - \exp\left(-\frac{(x - e_x)}{2\sigma^2}\right)$$

wherein $e_x$ comprises the focus of expansion of the horizontal distance map and $\sigma$ comprises a standard deviation.

24. The non-transitory computer-readable storage medium of claim 23, wherein the standard deviation is determined from a maximum vertical range of a region of the horizontal distance map.

25. The non-transitory computer-readable storage medium of claim 24, wherein the standard deviation is one-third the maximum vertical range of the region of the horizontal distance map.

26. The non-transitory computer-readable storage medium of claim 21, wherein the set of vertical weights have a minimum value at pixels located on a horizontal line intersecting the focus of expansion of the vertical distance map and have values which increase as a distance of a pixel from the horizontal line intersecting the focus of expansion of the vertical distance map increases.

27. The non-transitory computer-readable storage medium of claim 25, wherein a vertical weight associated with a pixel, (x,y) in the vertical distance map comprises $$w_y(x, y) = 1 - \exp\left(-\frac{(y - e_y)}{2\sigma^2}\right)$$

wherein $e_y$ comprises the focus or expansion or the vertical distance map and $\sigma$ comprises a standard deviation.

28. The non-transitory computer-readable storage medium of claim 27, wherein the standard deviation is determined from a maximum horizontal range of a region of the vertical distance map.

29. The non-transitory computer-readable storage medium of claim 28, wherein the standard deviation is one-third the maximum horizontal range of the region of the vertical distance map.

30. The non-transitory computer-readable storage medium of claim 21, wherein the focus of expansion of the horizontal distance map and the focus of expansion of the vertical distance map comprise a single focus of expansion.

* * * * *

UNITED STATES PATENT AND TRADEMARK OFFICE
CERTIFICATE OF CORRECTION

PATENT NO. : 8,351,653 B2
APPLICATION NO. : 12/869629
DATED : January 8, 2013
INVENTOR(S) : Morimichi Nishigaki It is certified that error appears in the above-identified patent and that said Letters Patent is hereby corrected as shown below:

In the Claims

Column 22, line 41, delete "comprises the focus or expansion or the vertical"
and insert --comprises the focus of expansion of the vertical--.

Signed and Sealed this
Sixth Day of August, 2013

Teresa Stanek Rea
*Acting Director of the United States Patent and Trademark Office*